(12) United States Patent
Nylander et al.

(10) Patent No.: US 8,781,468 B2
(45) Date of Patent: Jul. 15, 2014

(54) METHOD AND APPARATUS FOR SELECTING A SERVICE AREA IDENTIFIER FOR A USER EQUIPMENT IN A WIRELESS SYSTEM

(75) Inventors: Tomas Nylander, Värmdö (SE); Thomas Lindqvist, Mölndal (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 763 days.

(21) Appl. No.: 12/530,232

(22) PCT Filed: Feb. 1, 2008

(86) PCT No.: PCT/SE2008/050132
§ 371 (c)(1),
(2), (4) Date: Sep. 18, 2009

(87) PCT Pub. No.: WO2008/108717
PCT Pub. Date: Sep. 12, 2008

(65) Prior Publication Data
US 2010/0062768 A1 Mar. 11, 2010

Related U.S. Application Data

(60) Provisional application No. 60/893,759, filed on Mar. 8, 2007.

(51) Int. Cl.
*H04W 4/00* (2009.01)
(52) U.S. Cl.
USPC ......... 455/435.2; 455/444; 455/406; 370/338

(58) Field of Classification Search
USPC ................. 455/433, 434–436, 405–408, 444; 370/331–338
See application file for complete search history.

(56) References Cited

U.S. PATENT DOCUMENTS

| 7,864,673 | B2 | 1/2011 | Bonner |
| 8,204,506 | B2 * | 6/2012 | Lindqvist et al. ............. 455/450 |
| 8,326,296 | B1 * | 12/2012 | O'Neil et al. .............. 455/435.1 |
| 8,509,778 | B2 * | 8/2013 | Buchmayer et al. .......... 455/436 |
| 8,532,673 | B2 * | 9/2013 | Walker et al. .............. 455/456.2 |

(Continued)

FOREIGN PATENT DOCUMENTS

| GB | 2369002 A | 5/2002 |
| JP | 2001333221 A | 11/2001 |
| JP | 2004357041 A | 12/2004 |

(Continued)

*Primary Examiner* — Sharad Rampuria
(74) *Attorney, Agent, or Firm* — Coats & Bennett, PLLC

(57) ABSTRACT

The present invention relates to a method for allocating service area identifiers (SAI) for a femto cell (200A) upon the femto cell (200A) being created. According to the method, information is received about detected cells obtained by scanning performed by a femto radio base station (210A) that is serving the femto cell (200A) in addition to information identifying the femto base station (210A) or the femto cell (200A); a request for SAIs, is transmitted to a SAI selection entity (250, 400) based on the received information, and SAIs selected by a selection entity (250) are received together with an associated user type. The identifiers are further allocated for the created femto cell (200A). The present invention also relates to an apparatus (100, 300) and to the selection entity (250, 400).

20 Claims, 5 Drawing Sheets

(56) References Cited

U.S. PATENT DOCUMENTS

| | | |
|---|---|---|
| 8,639,243 B2 * | 1/2014 | Radulescu et al. ............ 455/434 |
| 2004/0018836 A1 | 1/2004 | Jang |
| 2006/0172732 A1 * | 8/2006 | Nylander et al. ............. 455/433 |
| 2007/0291750 A1 * | 12/2007 | Nylander et al. ............. 370/389 |
| 2009/0176479 A1 * | 7/2009 | Vikberg et al. ............... 455/406 |
| 2010/0184421 A1 * | 7/2010 | Lindqvist et al. ............. 455/418 |

FOREIGN PATENT DOCUMENTS

| | | |
|---|---|---|
| JP | 2008543177 A | 11/2008 |
| WO | 2004/004372 A1 | 1/2004 |
| WO | 2007/091893 A1 | 8/2007 |

* cited by examiner

| FEMTO RBS | IMSI | USER TYPE |
|-----------|--------|-----------------|
| RBS-1 | IMSI-1 | "HOME USER |
| RBS-1 | IMSI-2 | "VISITING USER" |
| RBS-1 | IMSI-3 | "ROAMING USER" |
| RBS-2 | IMSI-1 | "VISITING USER |
| RBS-2 | IMSI-2 | "HOME USER" |

FIGURE 3

METHOD AND APPARATUS FOR SELECTING A SERVICE AREA IDENTIFIER FOR A USER EQUIPMENT IN A WIRELESS SYSTEM

TECHNICAL FIELD

The present invention relates generally to the field of wireless or mobile communications network systems, and, more specifically, to a method and an apparatus for selecting a service area identifier for a user equipment in the wireless system.

BACKGROUND

Wireless access networks have become a key element of a variety of telecommunications network environments. As to enterprise network environments, they provide convenient wireless access to network resources for employees or customers carrying laptops and/or mobile handheld devices. In addition, wireless access points operable with diverse communication devices, such as laptops, mobile phones, etc., are broadly used in public environment such as e.g., hotels, train stations, airports, restaurants, schools, universities and homes, and are mostly used to offer high-speed interne access.

The telecommunication industries and operators are currently investigating the possibility to further increase the coverage area offered by cellular communications network systems to home or small areas. Examples of cellular communication network system are: the Universal Mobile Telecommunication Systems (UMTS) network, also known as third generation (3G) cellular network system or wideband code division multiplexing access (WCDMA) network; the Global System for Mobile telecommunications (GSM) network; the General Packet Radio Service (GPRS) network that utilizes the infrastructure of a GSM system; Two further examples of cellular access networks are EDGE and EGPRS which are further enhancements to GSM and GPRS. EDGE refers to enhanced Data rates for GSM Evolution, and EGPRS refers to Enhanced GPRS.

According to such investigation, a limited number of users (e.g. a user equipment (UE)) may be provided with e.g. WCDMA or 3G coverage using a small radio base stations (RBS) also called a "femto RBS" that would be connected to a radio network controller (RNC) of the 3G network using some kind of internet protocol (IP) based transmission. The coverage area so provided is called a "femto cell" to indicate that the coverage area is relatively small compared with an area of a macro cell of a public land mobile network (PLMN). Other terminology for a femto RBS includes a "Home RBS" and/or a "home 3G access point (H3GAP)" and/or a "home access point (HAP)" and/or a "home Node B (HNB)". It should be mentioned that small cells known as picocells may serve small areas such as part of a building, a street corner or a airplane cabin and are usually smaller than microcells, which in turn is smaller than a macrocell. The picocells are traditionally provided as coverage or capacity extensions and do not include an access control mechanism. This means that all users that are allowed to access macrocells of a PLMN are also allowed to access microcells and picocells of the same PLMN.

One alternative for the IP based transmission is to use fixed broadband access (like xDSL, Cable, etc.) to connect the femto RBS to the RNC. Another alternative would be to use mobile broadband access e.g. some WiMAX technologies or HSDPA and enhanced uplink also known as HSPA.

FIG. 1 illustrates an example of a WCDMA network 1 built with a traditional architecture including one or several RNCs 20 and femto RBSs 40 working as H3GAP. However the RBS's and RNC's may as well be collapsed and form a single node in a so called flat architecture. As shown in FIG. 1, the network 1 comprises a core network (CN) 80 connected to a RNC 20 that controls all radio base stations connected to it, i.e. macro RBS 30 and femto RBSs 40. The macro RBS 30 serves a macro cell 31 whereas a femto RBS 40 serves a femto cell 41. As illustrated, each femto RBS 40 serves its dedicated femto cell 41. As well known in the art, a RBS is typically situated at an interior (e.g. centre) of the respective cell which the RBS serves, but for the sake of clarity, the macro RBS 30 and the femto RBSs 40 of FIG. 1 are shown instead as being associated by double headed arrows to their respective cells. At least some of the femto cells 41 are geographically overlayed or overlapped by the macro cell 31.

A user equipment (UE) 50 communicates with one or more cells or one or more RBSs over a radio interface. The UE 50 can be a mobile phone (or "cellular phone"), a laptop with mobile termination and thus can be e.g. portable, pocket, handheld, computer-included, or car-mounted mobile device which can communicate voice and/or data with a radio access network. The UE 50 may further communicate with the radio access network via a femto RBS 40 through an internet protocol (IP) based transmission network 60 which, as described earlier, can be either broadband fixed IP based transmission (e.g. xDSL) or broadband mobile IP based transmission (e.g. WiMAX or HSPA) or any other suitable IP based transmission.

In the wireless communications network system depicted in FIG. 1, the interface between the each femto RBS 40 and the RNC 20 can be called the extended tub interface "Iub+" which is usually formed by an IP connection over the IP based transmission network 60. In some implementations, the Iub+ resembles the Iub interface between the macro RBS 30 and the RNC 20, but the Iub+ interface is modified for conveying additional information such as the identity of the femto RBS 40 e.g. during the initial power-on procedure of the femto RBS 40.

Also illustrated in FIG. 1, is the Iu interface used between the RNC 20 and the CN 80. Note that in a flat architecture there would not necessarily exist any Iub(+) interface because, as described above, in such flat architecture the RBS and the RNC can form a single node. In order to limit the users of UEs 50 of the femto cell 41 to the ones that are allowed, an access control feature can be implemented in the system. This way, at any UE attempt to camp on the femto cell, it is checked if the user is an allowed user. The international subscriber mobile identity (IMSI) of allowed users (or UEs) per femto RBS are stored in a database 70, known as an access control database (ACDB), to which the stand-alone or integrated RNC has access. This approach is described in the international patent application with publication number WO 2007/136339.

In prior art WCDMA networks that are based on macro/micro/pico cells of a PLMN i.e. WCDMA networks that do not include femto cells, a service area identifier (SAI) is used to identify an area consisting of one or more cells belonging to the same location area (LA). Such an area is called a service area and can be used for indicating the location of a UE to the core network (CN). A SAI of a current cell is indicated by the RNC to the CN when a signalling connection is established for a UE. The CN can use the SAI for the purposes of routing and charging as well as different location based services i.e. services that are based on the current location of the UE. Examples of such services:

Emergency call routing (e.g. to route a call to the correct emergency center)

Location calling services (e.g. to route a call to e.g. the closest taxi)

Legal intercept (to find out UE location on service area basis).

Charging indication (e.g. as charging areas).

The CN can also be informed about SAI changes for a UE using standard mechanisms in the Iu-interface and in a so called RANAP (Radio Access Network Application Part) protocol signalling over the Iu-interface. In the 3GPP standard (Third Generation Partnership Project), the SAI is defined as consisting of a service area code (SAC) together with the PLMN-id (consisting of a mobile country code (MCC), a mobile network code (MNC)) and the location area code (LAC)). The SAI can be defined according to the following:

SAI=PLMN-id∥LAC∥SAC

The LAI is also defined as consisting of PLMN-id and LAC and therefore SAI can be also defined as follows:

SAI=LAI∥SAC

The SAC is usually defined by the operator of the network and is normally configured in the RNC via O&M (operation and maintenance). The SAI is further set for a macro/micro/pico cell depending on the location of the macro/micro/pico cell. The SAI values are further coordinated between the radio access network and the CN so that e.g. the relevant location based services in the CN can be configured with this information. The RNC includes separately both the LAI and SAI for the current macro/micro/pico cell towards the CN. The LAI is used by the CN for e.g. mobility management (MM purposes) and the SAI can be used for e.g. location based services as previously described.

As described above, a SAI of a macro/micro/pico cell in the network is indicated by the RNC to the CN when a signalling connection is established for a UE. If femto cells are introduced in the network, a SAI for each such femto cell needs to be indicated by the RNC and mapped to, for example, a location information in the CN. With manual (or semi-manual) configuration, a femto cell could be given one or more SAIs and a mapping of these SAI(s) to, for example, a location information in the CN could be performed in a similar way as for the pico, micro and macro cells. However manual (or semi-manual) configuration both in the RNC and in the CN, of a huge number of femto cells e.g. hundred of thousands or even millions of femto cells is not considered a feasible solution especially since SAIs are not broadcasted in the network. In addition, it is normally the end users that install the femto cells on their own, without any intervention from the operator personnel. This means that the femto cell installation, including the selection of one or more SAIs, needs to happen automatically. In such a scenario with the huge number of femto cells, the RNC further needs to indicate all the SAIs to the CN which leads to excessive configuration load in the CN because the CN would be involved in all location based services. In addition to location based services, other services such as differentiated charging may also be offered to different UEs that are allowed to access a femto cell, which require additional identifiers to be defined in the CN. This would increase further the configuration load in the CN as well as in the RNC. In the light of the above problems related to the number of the femto cells, different types of UEs accessing a femto cell and the automatic nature of the installation procedure, a solution is needed that automatically selects the correct SAI for a UE accessing a specific femto cell.

SUMMARY

An object of the present invention is thus to obviate at least some of the above disadvantages by providing a method and an apparatus for automatic selection of a SAI that can support both location based services and differentiated charging, for a UE that is allowed to access a femto cell (the femto RBS of a femto cell) without increasing the configuration load in the core network or in the RNC.

According to a first aspect of the present invention, the above stated problem is solved by means of a method of selecting a SAI for a UE in a femto cell that is being served by a femto RBS. The femto RBS is connected to a wireless communications network. The method comprises: acquiring information identifying the UE that is allowed to access the femto RBS; requesting a database for information on a user type of the UE. The request being based on the acquired information identifying the UE and on an information identifying the femto RBS to which the UE is allowed to access. The method further comprises: selecting a SAI based on the information on the user type of the UE received/retrieved from the database.

According to a second aspect of the present invention, the above stated problem is solved by means of an apparatus for selecting a SAI for a UE in a femto cell that is being served by a femto RBS that is connected to a wireless communications network. The apparatus comprises: receiver means configured to acquire information identifying the UE that is allowed to access the femto RBS; transmitting means configured to transmit, to a database, a request for information on a user type of the UE. The request including the information identifying the UE and information identifying the femto RBS to which the UE is allowed to access. The apparatus further comprises selecting means configured to select a SAI for the UE based on the information on user type that is received from the database.

An advantage with the present invention is that the selected SAI can support both location based services and differentiated charging, depending on the user type of the UE and on the femto cell wherein the UE is located. The user type of the UE can for example indicate that the UE is a home user or a visiting user or a roaming user. A home user refers in this context to a subscriber/owner of the femto RBS while a visiting user is here considered to be a user that is allowed by the femto RBS subscriber/owner to use the femto RBS and is a subscriber in the operator's network. A roaming user is considered to be a user that is allowed by the femto RBS subscriber/owner to use the femto RBS but is not a subscriber in the operator's network.

The present invention will now be described in more details by means of several embodiments and with reference to the accompanying drawings, attention to be called to the fact, however, that the following drawings are illustrative only, and that various modifications and changes may be made in the specific embodiments illustrated as described within the scope of the appended claims.

BRIEF DESCRIPTION OF THE DRAWINGS

FIG. 3 is a table illustrating an example of a table that may be included in a database in accordance with an exemplary embodiment of the present invention.

DETAILED DESCRIPTION

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

Figure 1:
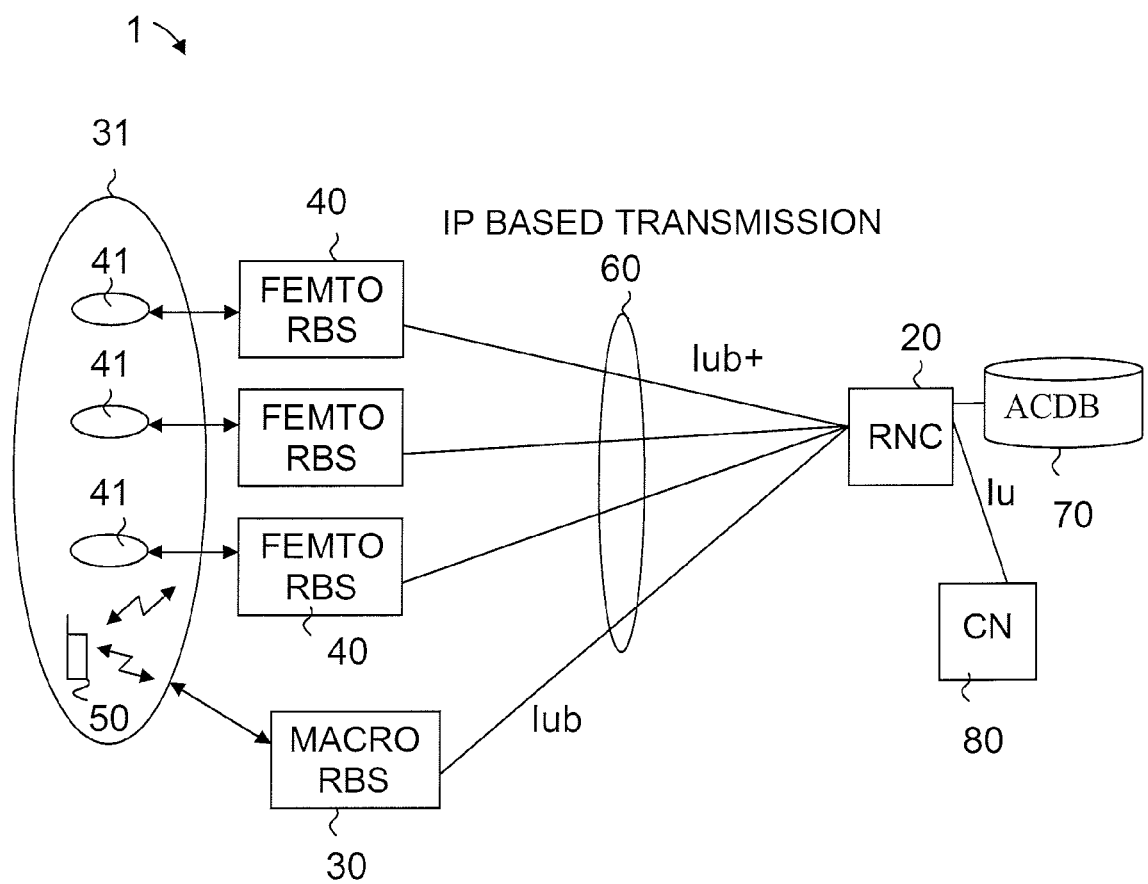
FIG. 1 is a block diagram illustrating an exemplary WCDMA wireless communications network including femto radio base stations in which the present invention may be used.

The present invention is described herein by way of reference to particular example scenarios. In particular the invention is described in a non-limiting general context in relation to a WCDMA wireless communications network including femto radio base stations that are connected to a radio network control node i.e. a radio network controller (RNC) of the WCDMA wireless network via a fixed IP based broadband access network in a traditional architecture as shown in FIG. 1. It should be noted that the present invention and it embodiments may also be applied to other types of radio technologies and architectures such as flat architecture for WCDMA, GSM, LTE (long term evolution), WiMAX etc.

Figure 2:
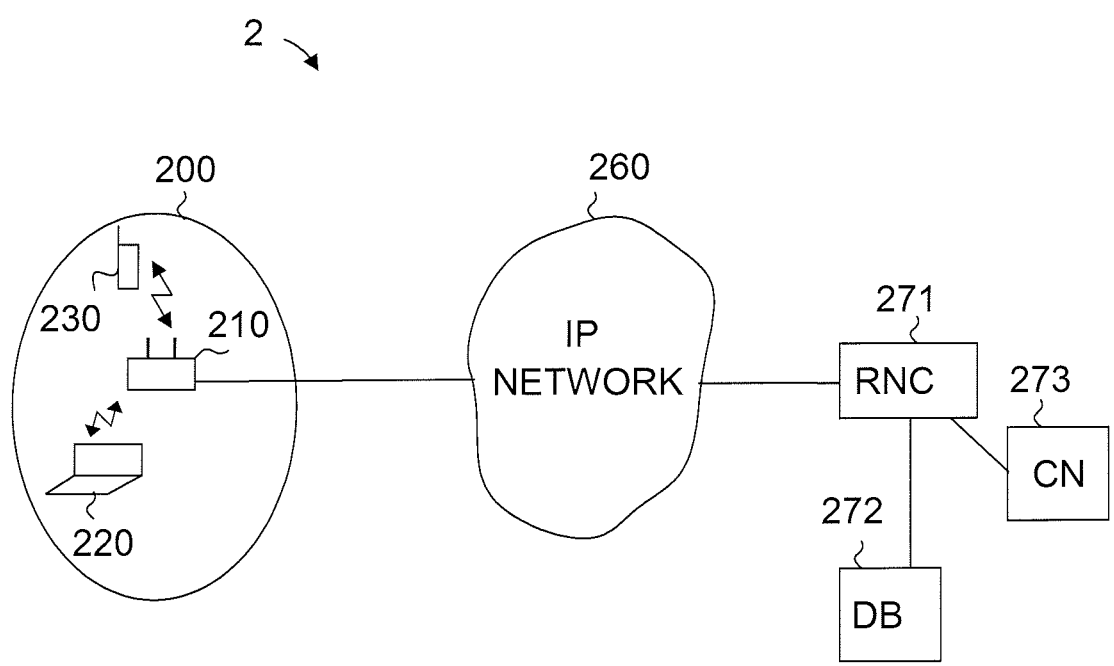
FIG. 2 illustrates a simplified block diagram illustrating another exemplary wireless communications network in which the present invention may be used.

In FIG. 2 and for sake of simplicity only a single femto RBS 210 is illustrated connected to a communications network 2 comprising an IP based network 260, an RNC 271, a database (DB) 272 and a CN 273. The CN 273 may comprise many elements such as MSC, SGSN, GGSN etc. A femto cell (e.g. home/office) 200 is served by the femto RBS 210. The femto RBS 210 is aimed to be used by allowed users of the home or enterprise/office where it is located. The femto RBS 210 is further integrated into the wireless network 2 and may thus share the radio frequency spectrum (or part of it) allocated to the wireless WCDMA network. A user equipment (UE) 230 can thus roam from the femto cell 200 to another macro radio cell (not shown) when leaving the coverage of the femto RBS 210, or can roam to the femto cell 200 from another macro cell (not shown) when located in the vicinity of the femto RBS 210. The femto RBS 210 may further be equipped with a connection for an Ethernet local area network within the home/enterprise and can therefore connect to one or several personal computers 220 over the Ethernet. A personal computer 220 that is equipped with a WCDMA (3G) UE functionality can connect to the femto RBS 210 and is thus, in this context, also referred to as a UE 220. The femto RBS 210 may further be equipped with or is connected, to an xDSL (e.g. ADSL, VDSL, ADSL2+, etc.) customer premises equipment (CPE) (not shown) which may have the function of a multi-mode modem, thus enabling it to provide IP connection over an IP network 260, to the wireless network using e.g. a digital subscriber line (DSL). As known, a femto cell 200 differs from a macro cell in that the location of a macro cell is known and planned by the operator of the network, whereas a femto cell can be dynamically installed/created in any place by the owner of the femto RBS without any operator intervention.

Referring to FIG. 2, as UE 230 is camping or accessing the femto cell 200 that is being served by the femto RBS 210, it is checked whether the UE is allowed to access the femto cell i.e. if the user of the UE is an allowed user. The information identifying allowed users (UEs) per femto RBS are stored in the database 272 to which an apparatus according to the present invention has access. In accordance with an embodiment of the present invention, such apparatus can be configured as radio network control node such as the RNC 271 depicted in FIG. 2. According to another embodiment of the present invention, such apparatus can be configured as a radio network control node incorporating the femto RBS 210. According to yet another embodiment of the present invention, such apparatus can be configured as a femto RBS such as the femto RBS 210. In such case, the femto RBS 210 communicates directly with the database 272 via the IP network 260. Such a scenario can be applicable in e.g. LTE.

As mentioned above, the database 272 stores information regarding the femto RBS 210 and which UEs that are allowed/authorized to access the femto RBS 210. Each UE, 230 can be identified using an information such as the international mobile subscriber identity (IMSI) or by some other permanent mobile identity, and the femto RBS 210 is identified using, for example, a preconfigured femto RBS identity (femto RBS-ID) such as a hardware identity. The database 272 is shown in FIG. 2 as a standalone unit. However, it is a functional entity that alternatively may be incorporated in the RNC 271, in the femto RBS 210 or any other node that is accessible by e.g. the femto RBS 210 (in for example a flat architecture). Furthermore, the database 272 can store information regarding a plurality of femto RBSs and which UEs that are allowed to access each femto RBS. In other words, the database 272 is not necessarily restricted to a single femto RBS 210. The database 272 is thus organised such that it can be queried using the femto RBS-ID as a search criteria to retrieve the allowed IMSIs or the allowed permanent mobile identities. The information concerning allowed IMSIs (or permanent mobile identities) is administered by the owner/subscriber of the femto RBS 210. A network operator may also administer the information concerning allowed IMSIs.

According to exemplary embodiments of the present invention, the information in the database is extended with the user type of the UE (UEs) accessing the femto cell 200. The user type can for example indicate if a UE is a home user, a visiting, a roaming user etc. as will be described in greater details below. As mentioned earlier, a home user refers in this context to a subscriber/owner of the femto RBS while a visiting user is here considered to be a user that is allowed by the femto RBS subscriber/owner to use the femto RBS and a subscriber in the operator's network. A roaming user is considered to be a user that is allowed by the femto RBS subscriber/owner to use the femto RBS but is not a subscriber in the operator's network.

According to an embodiment of the present invention, the user type of each UE can be stored in the database together with the IMSI or the permanent mobile identity of the UE and the femto RBS-ID to which the UE is allowed to access.

Referring to FIG. 3 there is illustrated an example of a table that can be included in the database 272, in accordance with an exemplary embodiment of the present invention. Each row in the table represents the relation between a femto RBS-ID, a permanent mobile identity (or IMSI) and a user type.

In the example shown in FIG. 3, information for two different femto cells (or femto RBSs) identified as RBS-1 and RBS-2 are included in the table. The information on these cells is further shown for three different users (or UEs) identified as IMSI-1, IMSI-2 and IMSI-3. The information in the table of FIG. 3 can be read as follows:

When UE-1 with IMSI-1 is accessing RBS-1, then the user type of UE-1 is "home user".

When UE-2 with IMSI-2 is accessing RBS-1, then the user type of UE-2 is "visiting user".

When UE-3 with IMSI-3 is accessing RBS-1, then the user type of UE-3 is "roaming user".

When UE-1 with IMSI-1 is accessing RBS-2, then the user type of UE-1 is "visiting user".

When UE-2 with IMSI-2 is accessing RBS-2, then the user type of UE-2 is "home user".

As will be described later, the user type of a UE is further used to indicate a charging tariff for the user of the UE when selecting a SAI for the UE.

Figure 4:
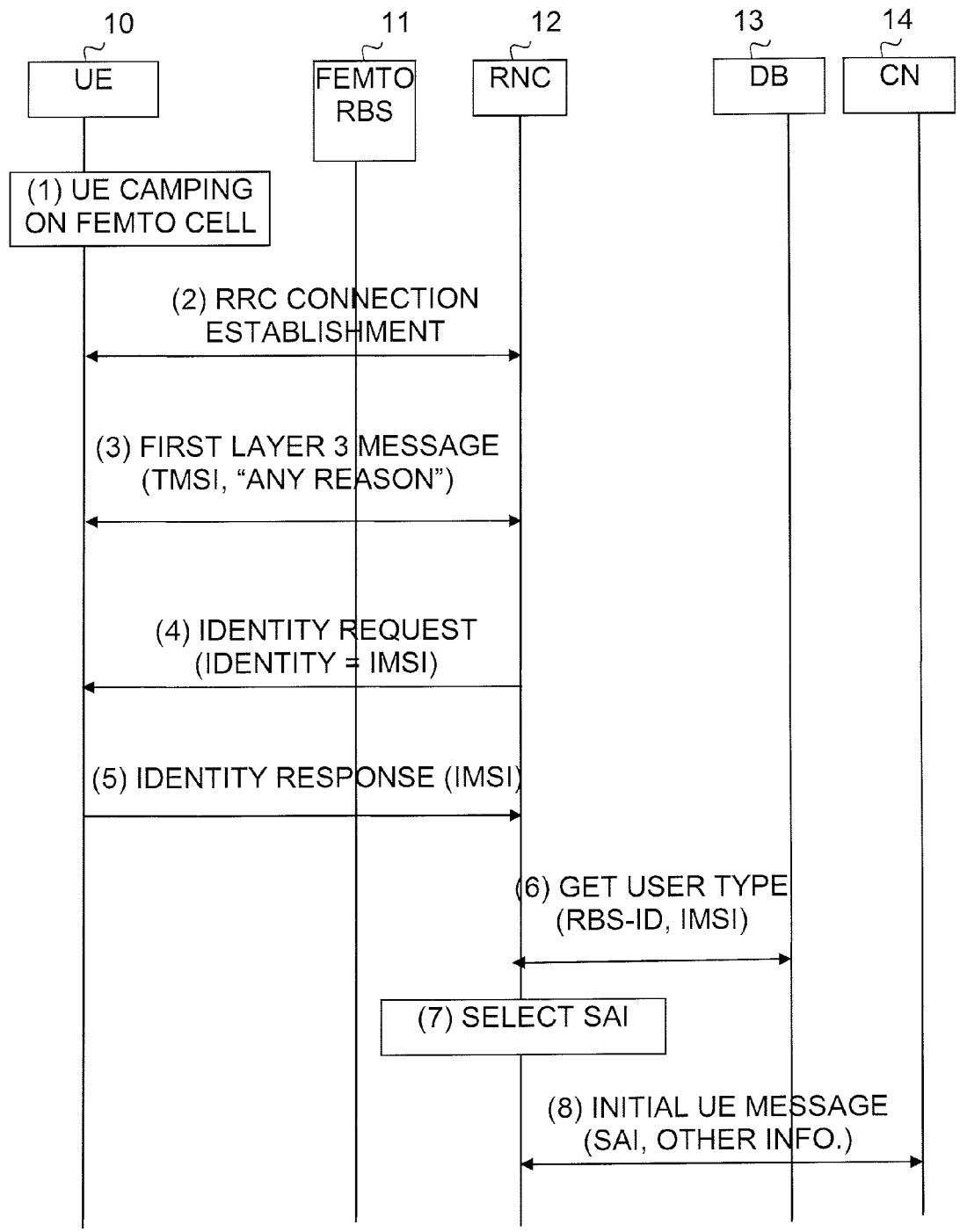
FIG. 4 illustrates a signalling diagram illustrating the flow of messages in an exemplary embodiment of the present invention.

Referring to FIG. 4 there is illustrated a signalling diagram illustrating the flow of messages in an exemplary embodiment of the method of selecting a SAI for a UE 10 according to an exemplary embodiment of the present invention. The UE 10 is here considered to be allowed to access the femto RBS 11 of the femto cell. The UE 10 is initially camped (1) on a femto cell that is served by a femto RBS 11 which in this exemplary embodiment is connected to an apparatus represented here by a radio network control node (RNC) 12. The UE 10 performs in (2) a connection establishment e.g. a radio resource control (RRC) connection establishment indicating the reason of the establishment. This could be because of Location Update, Mobile Originated Call, SMS, a response to a Paging or for any other reason. The RRC layer in the UE 10 triggers RRC connection establishment by sending a RRC CONNECTION REQUEST message (2) to the RNC 12. The RRC connection establishment may be established using existing principles as defined in 3GPP TS 25.331. In (3) the first Layer 3 message is sent from the UE on the established RRC connection. The message could be for example a CM (connection management) SERVICE REQUEST message or a LOCATION UPDATING REQUEST message or a PAGING RESPONSE message. The message from the UE 10 comprises a mobile identity identifying the UE 10. The mobile identity may be a temporary mobile identity such as a temporary mobile subscriber identity (TMSI) or a packet TMSI (P-TMSI). The mobile identity may also be a permanent mobile identity such as the international mobile subscriber identity (IMSI).

When the RNC 12 receives in (3) the Layer 3 message from the UE 10, it stores the message. The RNC 12 already knows from which femto cell or from which femto RBS 11 the RRC connection was established i.e. it already knows the information identifying the femto RBS 11 (femto RBS-ID). The femto RBS-ID was e.g. provided to the RNC 12 as part of the Iub+ interface during the initial femto RBS start-up procedure.

If the TMSI or the P-TMSI was used as the mobile identity in the Layer 3 message (e.g. the LOCATION UPDATING REQUEST message) from the UE 10, the RNC 12 triggers an identification procedure towards the UE 10 by sending an identity request message (4) to the UE 10. The identity type requested by the RNC 12 indicates "IMSI" or some other permanent mobile identity of the UE 10. The messages and information elements are as defined in 3GPP TS 24.008 with the main exception that the procedure is performed from the RNC 12 towards the UE 10 rather than from the CN 14.

In (5) the UE 10 responds with the IMSI (or some other permanent mobile identity). The RNC 12 thus now holds both the IMSI of UE 10 and the femto RBS-ID of femto RBS 11. According to an embodiment of the present invention, the RNC 12 requests in (6) the database 13 for information on a user type of the UE 10. In the request, both the IMSI of UE 10 and the femto RBS-ID are included. As previously described in conjunction with FIG. 3, the database (DB) 13 holds in its table information on the femto RBS (RBS-ID) and information identifying the UE 10 (i.e. IMSI). In addition and according to an embodiment of the present invention, DB 13 also holds information on the user type of UE 10. Therefore, as the RNC 12 queries in (6) the DB with RBS-ID and IMSI, the user type configured for this association in DB 13 is retrieved/returned to the RNC 12. As described earlier, the user type indicates if UE 10 is a home user, a visiting user or a roaming user.

When RNC 12 received the information of the user type, the RNC 12, according to an embodiment of the present invention, selects a service area identifier (SAI) for the UE 10. The selection of a SAI for UE 10 is thus dependent on the user type retrieved from DB 13. In addition, the selection of the SAI is also dependent on the femto cell wherein the UE 10 is located.

As previously mentioned, the user type of a UE also indicates a charging tariff for the user of the UE when selecting a SAI for the UE. If for example UE 10 is a home user, the charging tariff may indicate a low tariff to charged user by UE 10 (e.g. free tariff). If the UE 10 is a visiting user the charging tariff may indicate a medium tariff. If the UE 10 is a roaming user, the charging tariff may indicate a higher tariff. Thus according to the present invention, the selection of the SAI not only depends on femto cell where the UE is located but also depends on the user type of the UE.

Referring back to FIG. 4, after the RNC 12 has selected the correct SAI for the UE 10, the RNC 12 triggers in (8) the establishment of a Iu signalling connection by sending a INITIAL UE MESSAGE to the CN 14. This message contains the Layer 3 message previously stored in (3). According to an embodiment of the present invention, the selected SAI is also included in the message together with other information. The Iu signalling connection may be established using existing principles defined in 3GPP TS 25.413 and in other relevant 3GPP specifications.

In the above description, it was assumed that the Layer 3 message sent from the UE 10 to the RNC 12 in (3) included the TMSI or the P-TMSI as mobile identity identifying UE 10. However, if the permanent mobile identity or the IMSI of UE 10 is included in the Layer 3 message instead of the TMSI (or the P-TMSI), then signalling messages (4) and (5) may be skipped. In this case, the RNC 12 queries in (6) the DB 13 with femto RBS-ID and IMSI of UE 10, and the user type configured for this association in DB 13 is retrieved/returned to the RNC 12. The RNC 12 then selects a SAI based on the user type of UE 10 and based on the femto cell (or femto RBS 11) where UE 10 is located. Following the selection of the SAI, the RNC 12 includes the selected SAI in a message to CN 14 upon triggering an establishment of a signalling connection towards CN 14 as previously described.

According to another embodiment of the present invention, the RNC 12 can create an association between the temporary mobile identity of UE 10 and the permanent mobile identity of UE 10 and stores the association DB 13 during the access control. In such case the table of the database shown in FIG. 3 is extended with an additional field, namely the temporary mobile identity of UE 10. It should be noted that the DB 13 may store the association or associations between a temporary mobile identity and a permanent mobile identity for each allowed UE in a new table.

In this exemplary embodiment of the present invention, the UE 10 transmits to the RNC 12, the Layer 3 message containing the temporary mobile identity (e.g. TMSI or P-TMSI) of the UE 10. The RNC 12 then indicates in the request to DB 13, the TMSI or P-TMSI of UE 10 and the information identifying the femto RBS, i.e. femto RBS-ID. Since DB 13 has in its table the created association between the mobile identities of UE 10 i.e. IMSI and TMSI (or P-TMSI) in addition to the femto RBS-ID, it can inform the RNC 12 of the IMSI of the UE 10 and check the user type of UE 10. The user type of UE 10 is thereafter sent to the RNC 12 which, as previously described, selects a SAI based on the user type and on the femto cell (or femto RBS) where the UE 10 is located. Again, the charging tariff for the user of UE 10 is dependent on the user type retrieved from DB 13. Similarly to the previously described exemplary embodiment of the present invention, the RNC 12 includes the selected SAI in a message to CN 14 upon triggering an establishment of a signalling connection towards the CN 14.

However in this exemplary embodiment of the present invention, the RNC 12 is configured to intercept Layer 3 messages and to check these messages in the downlink (initially only the downlink direction from the CN to the UE). If e.g. protocol discriminator of the Layer 3 messages indicate e.g. MM (mobility management), then the RNC 12 is further configured to analyse the message type and to check whether the message is either TMSI (or P-TMSI) REALLOCATION COMMAND or a LOCATION UPDATING ACCEPT message. If also this is the case, then the RNC 12 analyses whether a new TMSI (or P-TMSI) is included in the message. The RNC 12 is further configured to store any new TMSI (or P-TMSI).

If all the above conditions are fulfilled, the RNC 12 then enables the interception and the checking of Layer 3 messages in the uplink direction also (i.e. from the UE to the CN). In case any of these indicate e.g. MM and the message type is TMSI (or P-TMSI) REALLOCATION COMPLETE, then the RNC 12 updates the association in the DB 13 regarding the UE 10 with the new TMSI (or P-TMSI) previously stored in the RNC 12.

It should be noted that if the current femto cell for the UE changes, the RNC 12 may select another SAI for the user of UE 10 depending on the request received at the DB 13 from RNC 12. As an example if UE 10 moves to another femto cell served by another femto RBS to which UE 10 is allowed to have access, then the association in the DB 13 for the UE 10 may indicate that the UE 10 is a visiting user in this femto cell which means that the correct SAI is selected based on the new femto cell where the UE 10 is located and based on the charging tariff which now is dependent on that the UE 10 is now a visiting user and not a home user. Therefore, the present invention allows the selection of different SAIs for different allowed users in the femto cells. In addition, each selected SAI, according to embodiments of the present invention, can support both the existing location based services and the above mentioned differentiated charging feature which is dependent on the user type of the UE.

It should be noted that no hardware changes are required in the UE, the femto RBS or the CN. In addition, no functional changes are needed in the UE or in the femto RBS and only minor functional changes are required in the CN. Although described in terms of an embodiment in a WCDMA network, the invention and its different exemplary embodiments may also be applied to other types of radio technologies such as LTE, GSM, WiMAX networks etc. It should also be contemplated that the selection of the SAI described above is not necessarily performed in the RNC i.e. it could be performed in an apparatus that comprises a RNC or in an apparatus that comprises a RNC and a femto RBS (i.e. an apparatus comprising a combination of the RNC and the femto RBS) or in an apparatus that comprises a femto RBS (for example in a LTE network).

Figure 5:
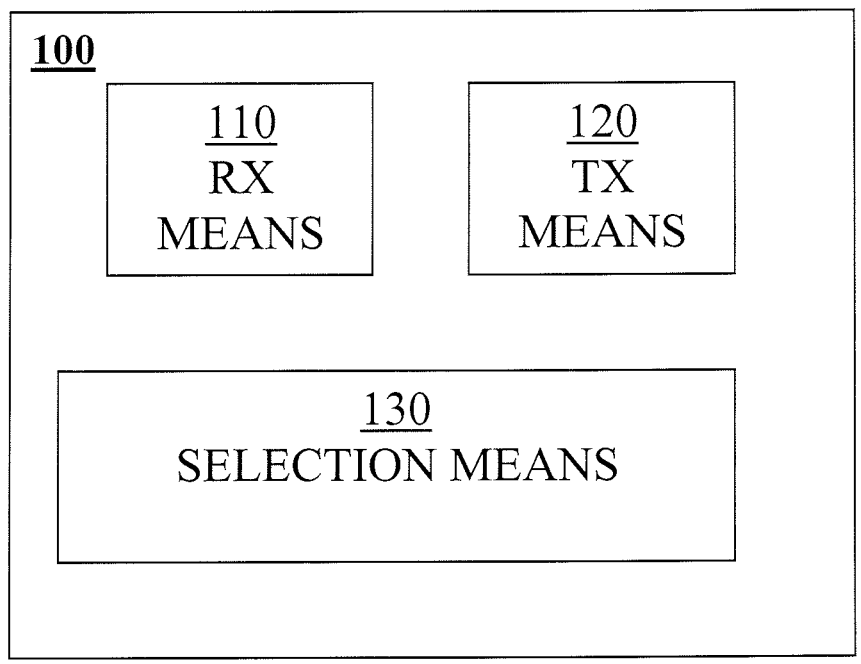
FIG. 5 illustrates an apparatus according to an exemplary embodiment of the present invention.

FIG. 5 illustrates an example of an apparatus for selecting a SAI for a UE in a femto cell, in accordance with an exemplary embodiment of the present invention.

As shown, apparatus 100 comprises receiver means 110 (RX MEANS) configured to acquire information identifying the UE as previously described. Apparatus 100 further comprises transmitting means 120 (TX MEANS) for transmitting to a database, a request for information on a user type of the UE. In the request, the acquired information identifying the UE is included together with information identifying a femto RBS that is serving the femto cell. Apparatus 100 further comprises selection means 130 for selecting a SAI for the UE based on the information received from the database (i.e. the user type). Note that apparatus 100 may comprise other elements not illustrated in FIG. 5. Furthermore, the different blocks of apparatus 100 are not necessarily separated but could be included in a single block.

The present invention and its embodiments can be realised in many ways. For example, one embodiment of the present invention includes a computer-readable medium having instructions stored thereon that are executable by a computer system located in one or several network nodes (apparatus) of the communication system, for selecting a SAI for a UE. The instructions executable by the computing system and stored on the computer-readable medium perform the method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method of selecting a service area identifier (SAI) for a user equipment (UE) in a femto cell that is served by a femto radio base station (RBS) said femto RBS being connected to a wireless communications network, said method comprising:
   acquiring information identifying said UE being allowed to access the femto RBS;
   requesting, via a request that includes both said information identifying the UE and an information identifying the femto RBS, a database for an information on a user type of the UE;
   selecting a SAI based on both the information on the user type of the UE received from the database and a charging tariff for the user of the UE, the charging tariff being dependent on the information on the user type retrieved from the database.

2. The method according to claim 1, wherein the step of acquiring comprises receiving a message from the UE, said message comprising a mobile identity identifying the UE.

3. The method according to claim 2, wherein the message indicates a temporary mobile identity as the mobile identity identifying the UE.

4. The method according to claim 3, further comprising requesting said UE of its permanent mobile identity and acquiring said permanent mobile identity.

5. The method according to claim 4, wherein the temporary mobile identity comprises a temporary mobile subscriber identity (TMSI) or a packet temporary mobile subscriber identity (P-TMSI) and the permanent mobile identity comprises an international subscriber mobile identity (IMSI).

6. The method according to claim 2, wherein the message indicates a permanent mobile identity of the UE as the mobile identity identifying the UE.

7. The method according to claim 6, wherein the step of requesting a database comprises indicating in the request information identifying the femto RBS and the permanent mobile identity of the UE, and retrieving from the database said information on a user type of the UE, said user type indicating whether the user of the UE is a home user or a visiting user or a roaming user in the femto cell served by the femto RBS.

8. The method according to claim 1, wherein the selected SAI is further dependent on the femto cell wherein the UE is located.

9. The method according to claim 8, further comprising including the selected SAI in a message to a core network (CN) of the wireless communications network upon triggering an establishment of a signalling connection towards the CN.

10. An apparatus for selecting a service area identifier (SAI) for a user equipment (UE) in a femto cell that is served by a femto radio base station (RBS), said femto RBS being connected to a wireless communications network, said apparatus comprising:
 a receiver configured to acquire information identifying said UE being allowed to access the femto RBS;
 a transmitter configured to transmit, to a database, a request for an information on a user type of the UE, said request including both the information identifying the UE and an information identifying the femto RBS;
 a selector configured to select a SAI for the UE based on both the information on the user type that is received from the database and a charging tariff for the user of the UE, the charging tariff being dependent on the information on the user type retrieved from the database.

11. The apparatus according to claim 10, wherein the receiver is configured to receive a message from the UE, said message comprising a mobile identity identifying the UE.

12. The apparatus according to claim 11, wherein the message indicates a temporary mobile identity as the mobile identity identifying the UE.

13. The apparatus according to claim 12, wherein the transmitter is configured to transmit to the UE a message requesting the UE of its permanent mobile identity and the receiver is configured to acquire the permanent mobile identity of the UE.

14. The apparatus according to claim 13, wherein the temporary mobile identity comprises a temporary mobile subscriber identity (TMSI) or a packet temporary mobile subscriber identity (P-TMSI) and the permanent mobile identity comprises an international subscriber mobile identity (IMSI).

15. The apparatus according to claim 11, wherein the wherein the message indicates a permanent mobile identity as the mobile identity identifying the UE, and wherein transmitter is configured to indicate the permanent mobile identity of the UE in said request to the database and the receiver of the apparatus is configured to retrieve said information on the user type based on the request, said user type indicating whether the user of the UE is a home user or a visiting user or a roaming user in the femto cell served by the femto RBS.

16. The apparatus according to claim 15, wherein the selector is configured to select a SAI based on the femto cell wherein the UE is located.

17. The apparatus according to claim 16, wherein the transmitter is further configured to include the selected SAI in a message to a core network (CN) of the wireless communications network upon triggering an establishment of a signalling connection towards the CN.

18. The apparatus according to claim 10, wherein the apparatus comprises a radio network control node in the wireless communications network.

19. The apparatus according to claim 10, wherein the apparatus comprises a radio network control node and a femto RBS.

20. The apparatus according to claim 10, wherein the apparatus comprises a femto RBS.

* * * * *